US012809205B2

(12) United States Patent
Lee et al.

(10) Patent No.: US 12,809,205 B2
(45) Date of Patent: Nov. 24, 2026

(54) DISPLAY DEVICE

(71) Applicant: CARUX TECHNOLOGY PTE. LTD., Aperia (SG)

(72) Inventors: Pei-Chin Lee, Tainan (TW); Ke-Chin Chang, Tainan (TW); You-Ren Liou, Tainan (TW); Yung-Kan Chen, Tainan (TW); Ching-Ming Chen, Tainan (TW); Hui-Chuan Huang, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 19/188,217

(22) Filed: Apr. 24, 2025

(65) Prior Publication Data

US 2025/0362538 A1 Nov. 27, 2025

Related U.S. Application Data

(60) Provisional application No. 63/652,072, filed on May 27, 2024.

(30) Foreign Application Priority Data

Mar. 3, 2025 (CN) ......................... 202510240748.7

(51) Int. Cl.
*G02F 1/1333* (2006.01)
*F21V 29/56* (2015.01)
(Continued)

(52) U.S. Cl.
CPC .. *G02F 1/133385* (2013.01); *G02F 1/133628* (2021.01)

(58) Field of Classification Search
CPC ......... G02F 1/133603; G02F 1/133605; G02F 1/133628; G02F 1/133385; F21V 29/56–59; F21V 29/60–677
See application file for complete search history.

(56) References Cited

U.S. PATENT DOCUMENTS

| | | | | |
|---|---|---|---|---|
| 5,682,216 A * | 10/1997 | Lin | G02F 1/133385 | 349/122 |
| 6,181,070 B1 * | 1/2001 | Dunn | F21V 29/67 | 315/117 |

(Continued)

FOREIGN PATENT DOCUMENTS

| | | |
|---|---|---|
| CN | 115718544 A | 2/2023 |
| CN | 115799225 A | 3/2023 |

(Continued)

OTHER PUBLICATIONS

Lee, Display Apparatus, Jul. 13, 2011, KR-20110080896-A (Year: 2011).*

(Continued)

*Primary Examiner* — Jong-Suk (James) Lee
(74) *Attorney, Agent, or Firm* — JCIPRNET

(57) ABSTRACT

A display device is provided. The display device includes a backlight for providing light source. The display device includes a panel disposed over the backlight for displaying an image. The display device also includes a first thermal-dissipation element disposed between the backlight and the panel, and the first thermal-dissipation element is a transparent element so that the light source can be provided to the panel. The first thermal-dissipation element has a cavity, and fluid fills into the cavity. When the display device is in operation, the fluid flows in the cavity.

18 Claims, 11 Drawing Sheets

(51) Int. Cl.
*F21V 29/60* (2015.01)
*G02F 1/1335* (2006.01)

(56) References Cited

U.S. PATENT DOCUMENTS

| | | | | |
|---|---|---|---|---|
| 10,969,615 | B2 | 4/2021 | Wang | |
| 2006/0192750 | A1* | 8/2006 | Lai | G02F 1/133604 345/102 |
| 2007/0114010 | A1* | 5/2007 | Upadhya | G06F 1/20 165/121 |
| 2008/0088573 | A1* | 4/2008 | Kim | G02F 1/133603 345/102 |
| 2009/0115738 | A1* | 5/2009 | Chueh | G06F 3/041 345/173 |
| 2010/0182562 | A1* | 7/2010 | Yoshida | H05K 7/20972 349/161 |
| 2012/0106081 | A1* | 5/2012 | Hubbard | G02F 1/133308 361/696 |
| 2014/0184980 | A1* | 7/2014 | Onoue | G02F 1/1336 349/58 |
| 2015/0009625 | A1* | 1/2015 | Chin | H05K 7/20145 361/695 |
| 2015/0212261 | A1* | 7/2015 | Masuda | H04N 5/645 348/794 |
| 2017/0231121 | A1* | 8/2017 | Morton | G02F 1/133308 |
| 2018/0088368 | A1* | 3/2018 | Notoshi | G02B 6/0085 |
| 2019/0182981 | A1* | 6/2019 | Huang | G02F 1/1336 |
| 2020/0096797 | A1* | 3/2020 | Teragawa | H05K 7/20145 |
| 2020/0285099 | A1* | 9/2020 | Wang | G02F 1/133385 |
| 2021/0341783 | A1* | 11/2021 | Ahn | G02F 1/133314 |
| 2021/0367116 | A1* | 11/2021 | Eom | F21K 9/68 |
| 2022/0206733 | A1 | 6/2022 | Hsiao | |
| 2022/0244585 | A1 | 8/2022 | Hsieh | |
| 2023/0040240 | A1 | 2/2023 | Hsiao | |
| 2023/0354521 | A1 | 11/2023 | Nien | |
| 2023/0365103 | A1 | 11/2023 | Hsiao | |
| 2023/0373306 | A1 | 11/2023 | Chang | |
| 2023/0387364 | A1* | 11/2023 | Ren | H01L 25/0753 |
| 2024/0021763 | A1 | 1/2024 | Nien | |
| 2024/0038185 | A1 | 2/2024 | Nien | |
| 2024/0200766 | A1 | 6/2024 | Sung | |
| 2024/0367594 | A1 | 11/2024 | Huang | |

FOREIGN PATENT DOCUMENTS

| | | | | |
|---|---|---|---|---|
| CN | 117912386 | A | 4/2024 | |
| KR | 20110080896 | A * | 7/2011 | G02F 1/133628 |
| WO | WO-2012140714 | A1 * | 10/2012 | H05K 7/2099 |

OTHER PUBLICATIONS

Yasuda, Display Apparatus, Oct. 18, 2021, WO-2012140714-A1 (Year: 2012).*

* cited by examiner

DISPLAY DEVICE

CROSS REFERENCE TO RELATED APPLICATIONS

This application claims the benefit of U.S. Provisional Application No. 63/652,072, filed May 27, 2024, and claims priority of China Patent Application No. 202510240748.7, filed on Mar. 3, 2025, the entirety of which are incorporated by reference herein.

BACKGROUND

Field of the Invention

The present invention relates to an electronic device, and, in particular, to a display device that includes a transparent thermal-dissipation element.

Description of the Related Art

Due to the booming development of technology, the usage of display devices is becoming more and more popular nowadays. In particular, the demand for high-brightness display devices is gradually increasing. Generally speaking, a high-brightness display device needs to be provided with dense light sources. However, high-brightness light sources generate high heat during the process of emitting light, which affects the functions of other components (for example, thin film transistors (TFT), optical films, panels, circuit boards, etc.). Therefore, how to solve the above problems is an important issue.

BRIEF SUMMARY

An embodiment of the present invention provides a display device including

BRIEF DESCRIPTION OF THE DRAWINGS

The present invention can be more fully understood by reading the subsequent detailed description and examples with references made to the accompanying drawings, wherein.

DETAILED DESCRIPTION

Figure 1:
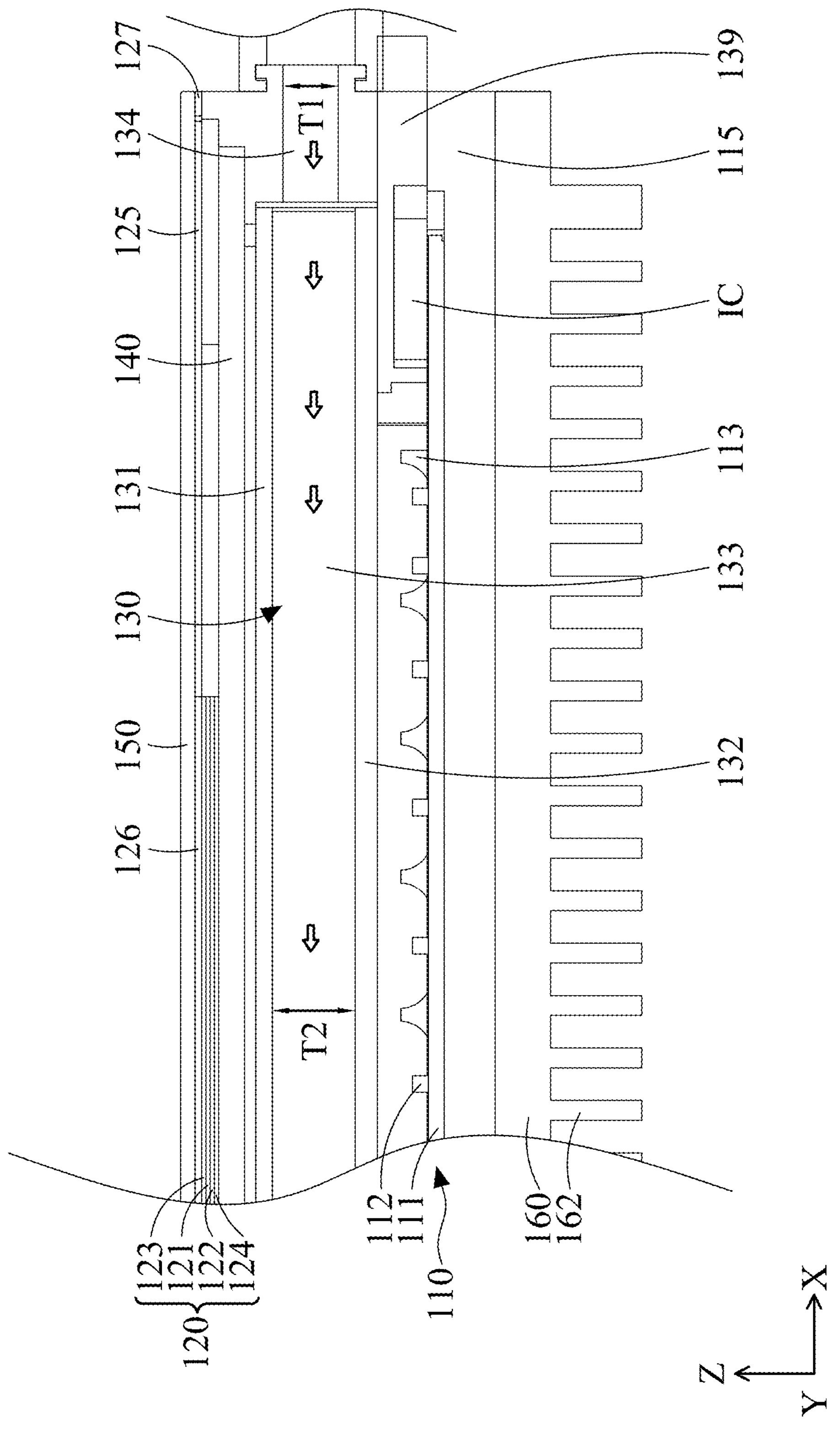
FIG. 1 shows a partial cross-sectional view of a display device in accordance with some embodiments of the present disclosure.

The present disclosure may be understood by referring to the following description and the appended drawings. It should be noted that, in order to make it easy for the reader to understand and to make the drawings concise, the drawings in the present disclosure may illustrate a part of the display device, and specific elements in the drawings are not drawn based on the actual scale. In addition, the number and the size of each component in the drawings merely serves as an example, and are not intended to limit the scope of the present disclosure. Furthermore, similar and/or corresponding numerals may be used in different embodiments for describing some embodiments simply and clearly, but not represent any relationship between different embodiment and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words “including”, “comprising”, “having” and the like are open words, so they should be interpreted as meaning “including but not limited to . . . ”. Therefore, when terms “including”, “comprising”, and/or “having” are used in the description of the disclosure, the presence of corresponding features, regions, steps, operations and/or components is specified without excluding the presence of one or more other features, regions, steps, operations and/or components.

In addition, in this specification, relative expressions may be used. For example, “lower”, “bottom”, “higher” or “top” are used to describe the position of one element relative to another. It should be noted that if a device is flipped upside down, an element that is “lower” will become an element that is “higher”.

When a corresponding component (such as a film layer or region) is referred to as “on another component”, it may be directly on another component, or there may be other components in between. On the other hand, when a component is referred “directly on another component”, there is no component between the former two. In addition, when a component is referred “on another component”, the two components have an up-down relationship in the top view, and this component can be above or below the other component, and this up-down relationship depends on the orientation of the device.

It should be understood that, although the terms “first”, “second” etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

In the present disclosure, the length, width, and/or height can be measured by using an optical microscope (OM), or using a cross-sectional structure image in the electron microscope. However, the aforementioned measurements are merely examples, and the present disclosure is not limited thereto. In addition, a certain error may be present in a comparison with any two values or directions. The terms "about," "equal to," "equivalent," "the same," "essentially" or "substantially" are generally interpreted as within 10% of a given value or range, or as interpreted as within 5%, 3%, 2%, 1%, or 0.5% of a given value or range. In addition, the term "electrically connected" may be used below. It should be understood that if the present disclosure recites "the first element is electrically connected to the second element," it may be interpreted as that the first element and the second element are electrically connected to each other and may be synchronously controlled by a single operation, which may include the case "there may be other elements between the first element and the second element to electrically connect the former two," or include "the first element and the second element are directly electrically connected without other elements." When it is mentioned in the present disclosure that the first element is "directly electrically connected" to the second element, it may be taken to mean that "the first element and the second element are directly electrically connected without other elements." In addition, the term "electrically insulated" may be used below. It should be understood that if the present disclosure recites "the first element and the second element are electrically insulated," it may be interpreted as that the first element and the second element are electrically separated without being connected to each other, nor synchronously controlled by a single operation.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

FIG. 1 shows a partial cross-sectional view of a display device 100 in accordance with some embodiments of the present disclosure. The display device 100 may include, for example, a backlight device, an antenna device, a light-emitting device, a sensing device, a touch device, or a splicing device, but the present disclosure is not limited thereto. The display device 100 may be a bendable or flexible display device. The display device 100 may be a non-self-luminous display device or a self-luminous display device. The antenna device may be a liquid-crystal antenna device or a non-liquid-crystal antenna device. The sensing device may be a sensing device that detects capacitance, light, heat, or ultrasound, but the present disclosure is not limited thereto. The display device 100 may include electronic components, and the electronic components may include passive components and active components, such as capacitors, resistors, inductors, diodes, drive components, transistors, etc. The display device 100 may include, for example, a diode, a liquid-crystal, a light-emitting diode (LED), a quantum dot (QD), fluorescence, phosphor, other suitable display media, or a combination thereof. In some embodiments, the diodes may include light-emitting diodes or photodiodes. The light-emitting diodes may, for example, include organic light-emitting diodes (OLEDs), mini LEDs, micro LEDs or quantum dot LEDs, but the present disclosure is not limited thereto. The splicing device may be, for example, a display splicing device or an antenna splicing device, but the present disclosure is not limited thereto. It should be noted that the display device 100 may be any combination of the above-mentioned devices, but the present disclosure is not limited thereto. In addition, the shape of the display device 100 may be rectangular, circular, polygonal, shapes with curved edges or other suitable shapes. The display device 100 may have peripheral systems such as drive systems, control systems, light-source systems, and rack systems, etc. to support display devices, antenna devices, wearable devices (for example, including augmented reality (AR) or virtual reality (VR)), vehicle-mounted devices, or splicing devices.

The following paragraphs will describe the content of the present disclosure with respect to the partial structure of the display device 100, but the present disclosure is not limited thereto. It should be understood by those skilled in the art that the display device 100 may also include other structures or be provided with suitable electronic components to perform the desired functions. In addition, the disclosed embodiment illustrates the structure of the display device 100 in a schematic manner. Therefore, those skilled in the art should understand that the structures shown are only for illustration purposes and are not intended to limit the scope of the present disclosure. A II possible structures that are consistent with the description of this disclosure are included in the scope of this disclosure. In addition, in the disclosed embodiment, an X direction, a Y direction, and a Z direction that are perpendicular to each other are defined. These directions are for illustration purposes only and are not intended to be limiting to any particular direction.

As shown in FIG. 1, the display device 100 may include a backlight 110, a panel 120, a thermal-dissipation element 130, an optical layer 140, and a cover plate 150. Specifically, the thermal-dissipation element 130 is disposed between the backlight 110 and the panel 120, and the thermal-dissipation element 130 is a transparent element, so that the light source provided by the backlight 110 can reach the panel 120. In some embodiments, the backlight 110 may include a substrate 111, light-emitting elements 112 that are disposed on the substrate 111, and a support structure 115 for supporting overlying elements. For example, the substrate 111 may include a metal material, such as aluminum (AI), magnesium (Mg), the alloys thereof, or other suitable thermally conductive materials, but the present disclosure is not limited thereto. As a result, the substrate 111 can help to dissipate the heat generated by the light-emitting elements 112. In some embodiments, the substrate 111 may also include glass fiber (for example, FR-4) or may be a flexible printed circuit (FPC). In some embodiments, the light-emitting elements 112 may be light-emitting diodes (LED) for providing light source to the panel 120. However, the present disclosure is not limited thereto. In some embodiments, the backlight 110 may include barrier walls 113 that are disposed around the light-emitting elements 112 and configured to guide the light generated by the light-emitting elements 112 to the panel 120. In some embodiments, the barrier walls 113 may have arc-shaped sidewalls, and are disposed around the light-emitting elements 112 to facilitate guiding the light emitted by the light-emitting elements 112 toward the user (for example, towards the cover plate 150). In some embodiments, the number of the light-emitting elements 112 disposed between two adjacent outermost barrier walls 113 is greater than the number of the light-emitting elements 112 disposed between two adjacent inner barrier walls 113. For example, two light-emitting elements 112 may be disposed between adjacent sidewalls of the outermost barrier walls 113, and one light-emitting element 112 may be disposed between two adjacent inner barrier walls 113. However, the present disclosure is not limited thereto. That is, more or fewer light-emitting elements 112 may be disposed between adjacent sidewalls of the outermost barrier walls 113 to increase the light output at the outermost side and make the overall backlight optical quality more uniform.

In some embodiments, the panel 120 is disposed between the backlight 110 and the cover plate 150. In some embodiments, the panel 120 may include an upper substrate 121, a lower substrate 122, an upper polarizing film 123, and a lower polarizing film 124, wherein the upper polarizing film 123 and the lower polarizing film 124 may be located at upper and lower sides of the upper substrate 121 and the lower substrate 122, respectively. For example, the upper substrate 121 and the lower substrate 122 may be flexible substrates or inflexible substrates, and the materials of the substrates may include, for example, glass, sapphire, ceramic, plastic, or other suitable materials. The plastic material may be, for example, polyimide (PI), polyethylene terephthalate (PET), polycarbonate (PC), polyether oxime (PES), polybutylene terephthalate (PBT), polynaphthalene ethylene glycolate (PEN) or polyarylate (PAR), other suitable materials, or combinations thereof, but the present disclosure is not limited thereto. In some embodiments, the upper substrate 121 may be, for example, a color filter substrate, and the lower substrate 122 may be, for example, a thin-film transistor (TFT) substrate, but the present disclosure is not limited thereto. In some embodiments, the panel 120 may be provided with a liquid-crystal layer (not shown), and the liquid-crystal layer may include nematic liquid-crystal, smectic liquid-crystal, cholesteric liquid-crystal, blue phase liquid-crystal or any other suitable liquid-crystal material.

In addition, the thermal-dissipation element 130 includes an upper transparent layer 131, a lower transparent layer 132, a cavity 133 formed by the upper transparent layer 131 and the lower transparent layer 132, and a fluid inlet 134 in communication with the cavity 133. In some embodiments, the materials of the upper transparent layer 131 and the lower transparent layer 132 may include glass, polyethylene terephthalate (PET), polyimide (PI), or other suitable transparent materials. Specifically, the thermal-dissipation element 130 may have a heat insulation effect, thereby separating the panel 120 and the optical layer 140 from the heat source (for example, the light-emitting elements 112), thereby reducing the risk of failure of the panel 120 and the optical layer 140 due to heat. Therefore, the upper transparent layer 131 and the lower transparent layer 132 may have a heat-insulating property. In some embodiments, the thickness of the upper transparent layer 131 and/or the lower transparent layer 132 may be in the range of about 0.5 mm to about 2 mm, such as about 1 mm, about 0.5 mm, etc., and the above thickness may be measured, for example, along the normal direction (such as the Z axis) of the display device 100. The thickness of the upper transparent layer 131 may be greater than, equal to, or less than the thickness of the lower transparent layer 132. Any thickness configuration of the upper transparent layer 131 and the lower transparent layer 132 is included in the scope of the present disclosure. For example, the thickness of the upper transparent layer 131 is less than the thickness of the lower transparent layer 132.

In some embodiments, the width of the lower transparent layer 132 is greater than the width of the area where the light-emitting elements 112 are disposed. In other words, in a horizontal direction (for example, the X direction), the side of the lower transparent layer 132 is separated from the outermost light-emitting element 112 by a distance d. In some embodiments, the lower transparent layer 132 may extend onto the support 139 covering the integrated circuit element IC. In this way, the thermal-dissipation element 130 can also dissipate the heat generated by the integrated circuit element IC.

In addition, the fluid is filled into the cavity 133 of the thermal-dissipation element 130. When the display device 100 is in operation, the fluid can flow in the cavity 133 (as indicated by the arrows in the figure), for example, from the fluid inlet 134 into the cavity 133. In some embodiments, the fluid inlet 134 may have a thickness T1, the cavity 133 may have a thickness T2, and the thickness T2 of the cavity 133 is greater than the thickness T1 of the fluid inlet 134. In some embodiments, the thickness T1 may be in the range of about 2 mm to about 8 mm, for example, about 3 mm, about 5 mm, about 7 mm, etc., and the thickness T2 may be in the range of about 3 mm to about 13 mm, for example, about 5.5 mm, about 8.5 mm, about 11.5 mm, etc. The thicknesses T1 and T2 may be measured, for example, along the normal direction (such as the Z axis) of the display device 100. With the above configuration, there can be enough fluid in the thermal-dissipation element 130 to dissipate heat, and the size of the display device 100 can be kept small, thereby providing users with a good user experience.

In some embodiments, the fluid flowing in cavity 133 includes gas or liquid. For example, the gas may include atmospheric air. Liquids may include water, ethylene glycol, diethylene glycol, or propylene glycol. The heat generated by the heat source (for example, the light-emitting elements 112) may be dissipated by the flow of the fluid. In some embodiments, the fluid is transparent to reduce the impact on the display effect of the display device 100. In some embodiments, when the display device 100 reaches a critical temperature, the fluid flows in the cavity 133. When the temperature of the display device 100 is lower than the critical temperature, the fluid stops flowing in the cavity 133 or the flow rate of the fluid is reduced. In this way, the risk of the display device 100 being overheated can be reduced, and the operating cost of the display device 100 can also be reduced.

In addition, in some embodiments, the optical layer 140 is disposed between the panel 120 and the thermal-dissipation element 130. The optical layer 140 is configured to improve the display effect of the display device 100 and may include, for example, a lower diffusion film, an upper diffusion film, a lower brightness enhancement film, an upper brightness enhancement film, a prism sheet or an inverse prism sheet, but the present disclosure is not limited thereto. The display device 100 further includes a light-shielding member 125 that is disposed adjacent to the panel 120 and located below the cover plate 150. The light-shielding member 125 may be configured to shield light so that the display device 100 has a good display effect. In some embodiments, the optical adhesive layer 126 is disposed between the cover plate 150 and the panel 120 to bond the cover plate 150 and the panel 120. For example, the optical adhesive layer 126 may include optical clear adhesive (OCA). In some embodiments, an adhesive layer 127 is disposed adjacent to the light-shielding member 125 and bonds the cover plate 150 to the thermal-dissipation element 130. In some embodiments, the adhesive layer 127 may be black to achieve a good light-shielding effect. In some embodiments, the adhesive layer 127 and the light-shielding member 125 may be made of the same material and manufactured by the same process. However, the present disclosure is not limited thereto.

In addition, the display device 100 further includes a thermal-dissipation element 160, which is made of a thermal conductive material such as metal. The thermal-dissipation element 160 may be disposed on the lower surface of the backlight 110 and include a plurality of thermal-dissipation fins 162. The thermal-dissipation fins 162 can increase the surface area of the thermal-dissipation element 160 to improve the thermal-dissipation effect. In some embodiments, the fluid also flows through the thermal-dissipation fins 162 of the thermal-dissipation element 160 to dissipate heat. In some embodiments, the substrate 111 of the backlight 110 may be in contact with the thermal-dissipation element 160. As described above, the substrate 111 may include thermal conductive materials such as metal, so the substrate 111 and the thermal-dissipation element 160 may form a good thermal conductive path, which is beneficial for dissipating the heat generated by the heat source (for example, the light-emitting elements 112) of the display device 100.

Figure 2:
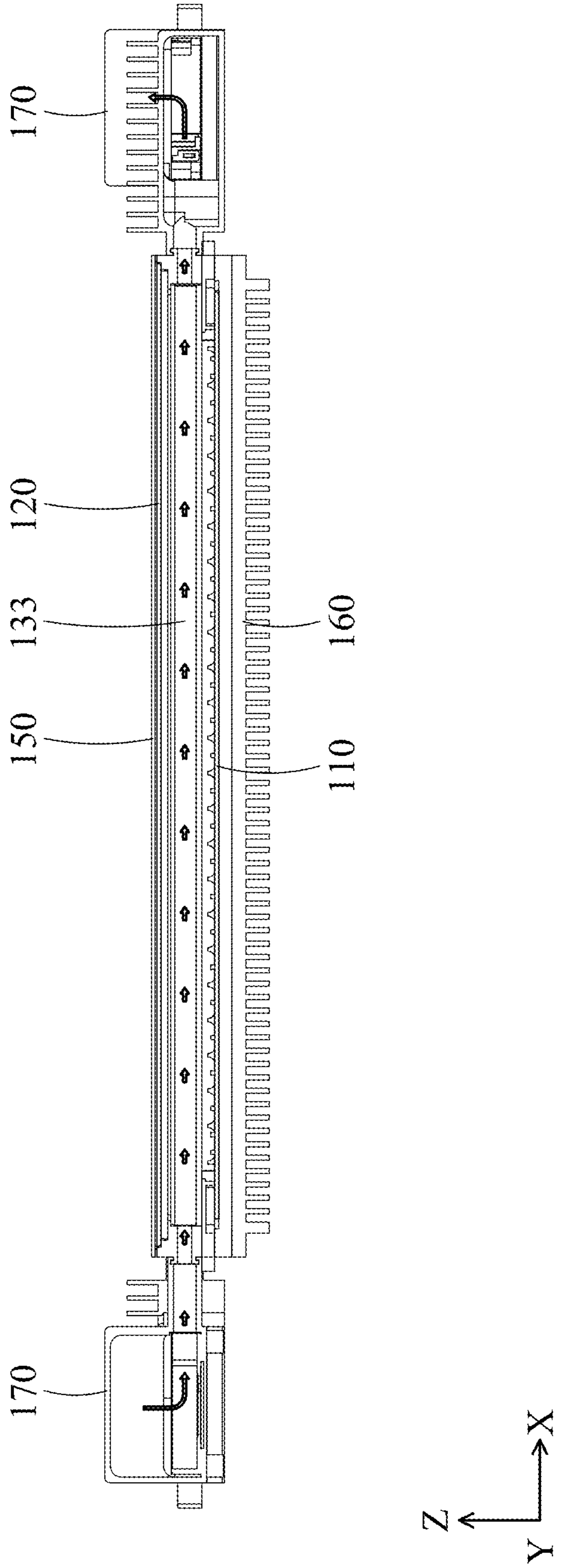
FIG. 2 shows a cross-sectional view of the display device in accordance with some embodiments of the present disclosure.
Figure 3:
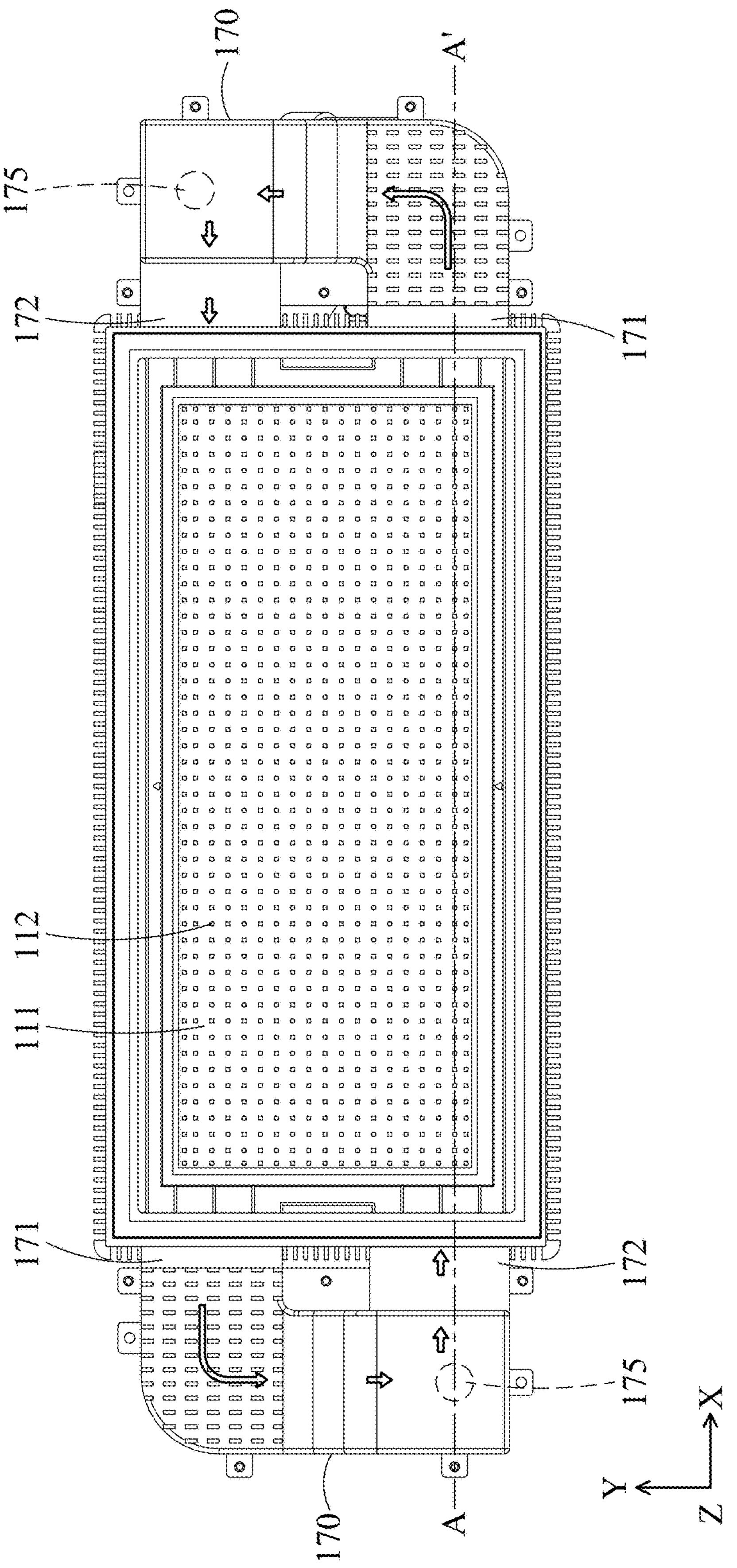
FIG. 3 shows a top view of the display device in accordance with some embodiments of the present disclosure.

FIG. 2 shows a cross-sectional view of the display device 100 in accordance with some embodiments of the present disclosure. FIG. 3 shows a top view of the display device 100 in accordance with some embodiments of the present disclosure. For example, FIG. 2 may be drawn along line A-A' shown in FIG. 3, but the present disclosure is not limited thereto. As shown in FIGS. 2 and 3, the display device 100 includes at least one ventilation module 170 (two ventilation modules 170 are shown in the figures), which is communicated with the cavity 133 and is configured to circulate the fluid in the cavity 133 (as shown by the arrows in the figures). In some embodiments, the ventilation module 170 may be disposed on opposite sides of the backlight 110, and may include a driver (such as a fan, not shown) to drive the fluid to circulate in the cavity 133. It should be understood that the configuration of the ventilation module 170 in this embodiment is merely an example, and those skilled in the art can understand that any configuration of the ventilation module 170 (such as quantity, position, orientation, etc.) is included in the scope of the present disclosure based on the content of the present disclosure.

Figure 4:
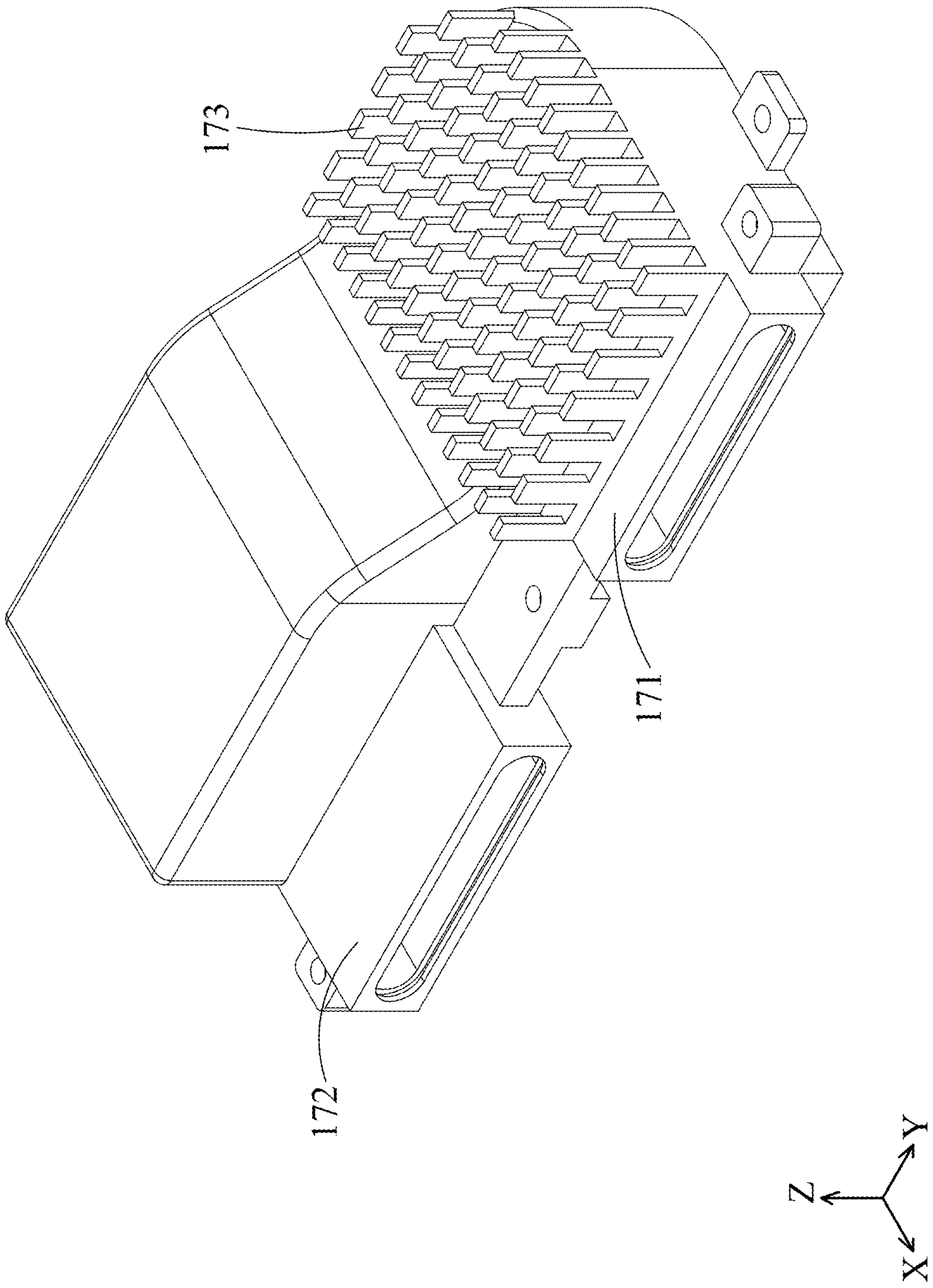
FIG. 4 shows a perspective view of the ventilation module in accordance with some embodiments of the present disclosure.

FIG. 4 shows a perspective view of the ventilation module 170 in accordance with some embodiments of the present disclosure. As shown in FIG. 4, in some embodiments, the ventilation module 170 includes an outlet 171 and an inlet 172 opposite to each other. Specifically, the fluid may flow from the cavity 133 into the ventilation module 170 via the inlet 172, and be driven by the ventilation module 170 to pass through the guide hole 175 (shown in FIG. 3) and flow back to the cavity 133 via the outlet 171 for thermal-dissipation. In some embodiments, the ventilation module 170 includes a plurality of thermal-dissipation fins 173, thereby increasing the surface area of the ventilation module 170, which is beneficial for heat exchange (such as, cooling) between the fluid in the ventilation module 170 and the external environment. In this way, the cooled fluid flows back into the cavity 133, thereby improving the thermal-dissipation performance of the thermal-dissipation element 130.

Figure 5:
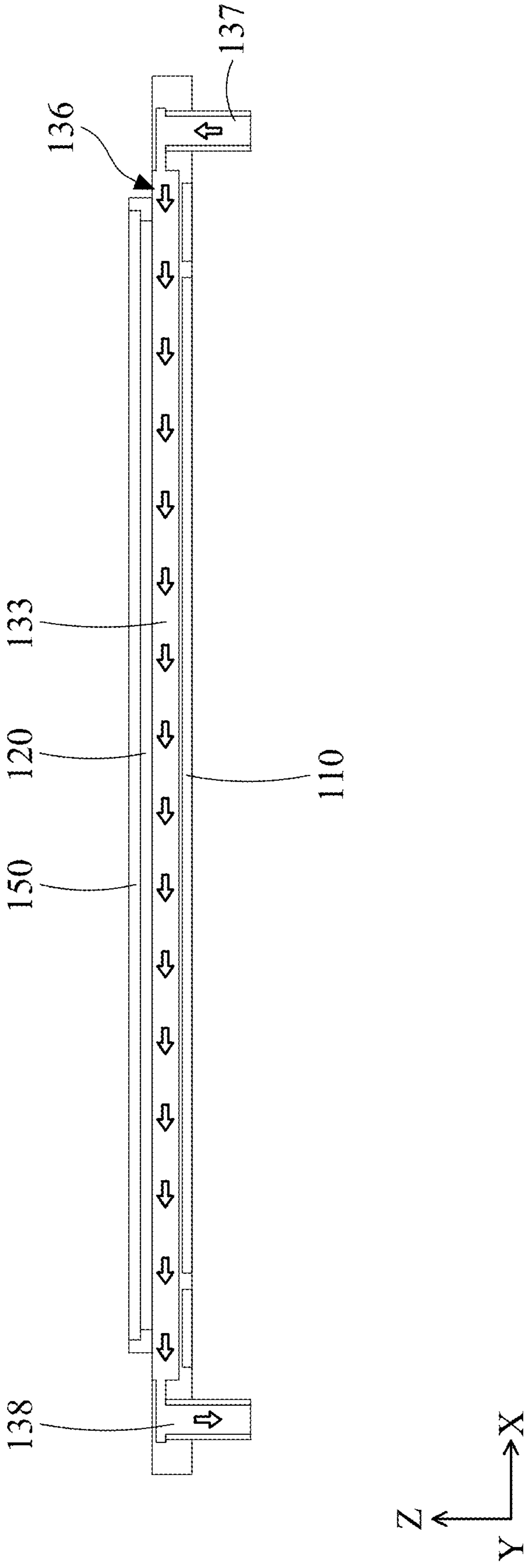
FIG. 5 shows a top view of the display device in accordance with some embodiments of the present disclosure.
Figure 6:
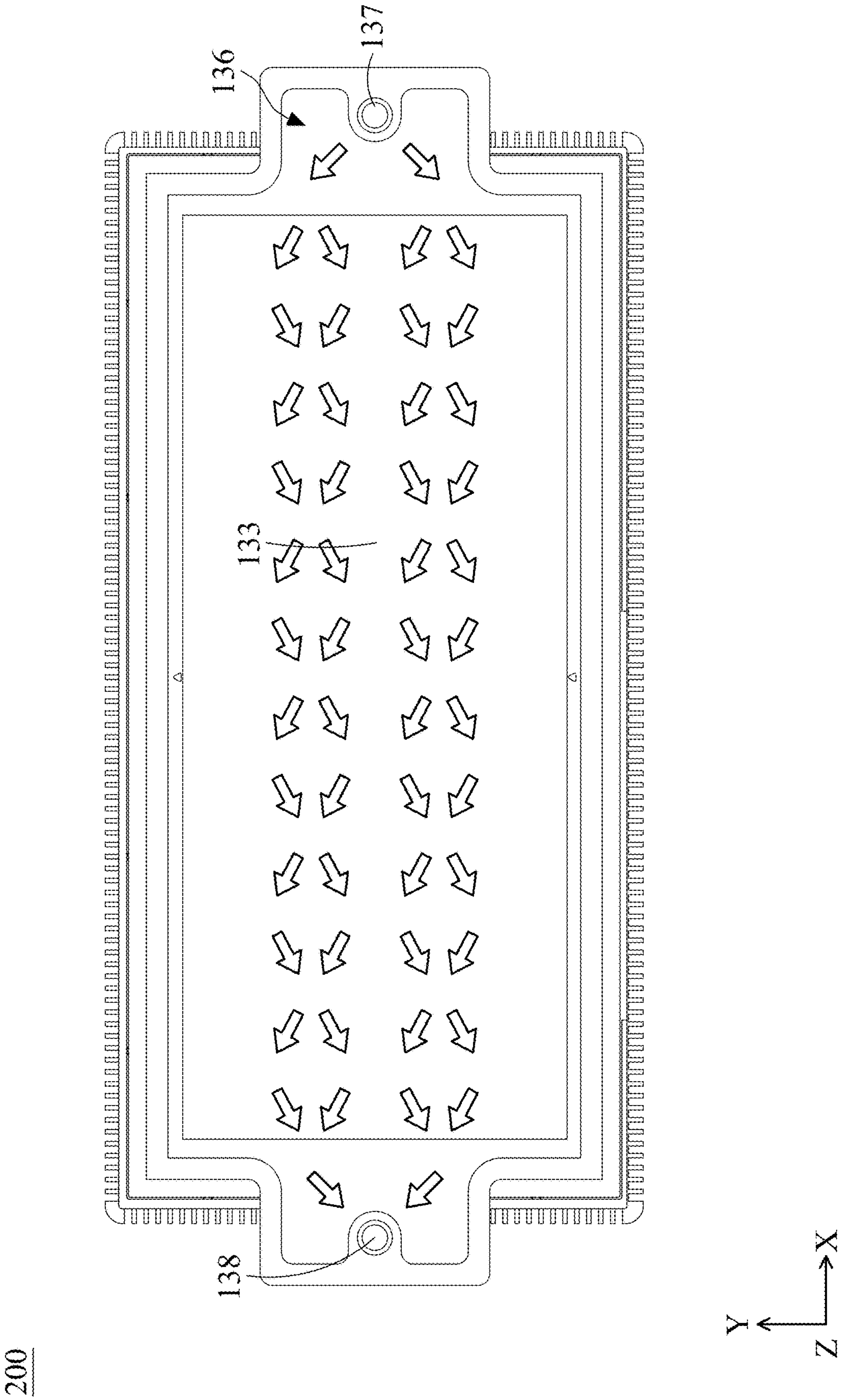
FIG. 6 shows a cross-sectional view of the display device in accordance with some embodiments of the present disclosure.

FIG. 5 shows a top view of the display device 200 in accordance with some embodiments of the present disclosure. FIG. 6 shows a cross-sectional view of the display device 200 in accordance with some embodiments of the present disclosure. It should be understood that the display device 200 of this embodiment may include elements or portions that are the same as or similar to those of the display device 100 shown in the above embodiment. These elements or portions will be denoted by the same or similar reference numerals and will not be described in detail below for the sake of brevity. As shown in FIGS. 5 and 6, the display device 200 may include a backlight 110, a panel 120, and a cover plate 150. In some embodiments, the width of the cover plate 150 is greater than the width of the panel 120, so that the panel 120 can be attached to the cover plate 150. For example, the widths of the cover plate 150 and the panel 120 may be measured in a direction parallel to a horizontal plane (for example, the X-Y plane), but the present disclosure is not limited thereto. In this embodiment, the display device 200 may include a thermal-dissipation element 136. In some embodiments, the thermal-dissipation element 136 includes a fluid inlet 137 and a fluid outlet 138 that are opposite to each other. Specifically, the fluid may flow into the cavity 133 of the thermal-dissipation element 136 via the fluid inlet 137, and then flow out of the cavity 133 via the fluid outlet 138 after the thermal-dissipation element 136 absorbs heat generated by the heat source (for example, the light-emitting elements 112) of the display device 200. In some embodiments, a flow divider (not shown) may be disposed at the fluid inlet 137 so that turbulence is generated when the fluid flows through the fluid inlet 137. In this way, the flow rate of the fluid can be increased and the fluid can be driven to flow toward the edge or corner of the display device 200, thereby improving the thermal-dissipation performance. It should be understood that the fluid driving device may be disposed outside the display device 200. In this way, the overall structure of the display device 200 can be simplified and the size of the display device 200 can be reduced to meet the requirements of manufacturing and use.

Figure 7:
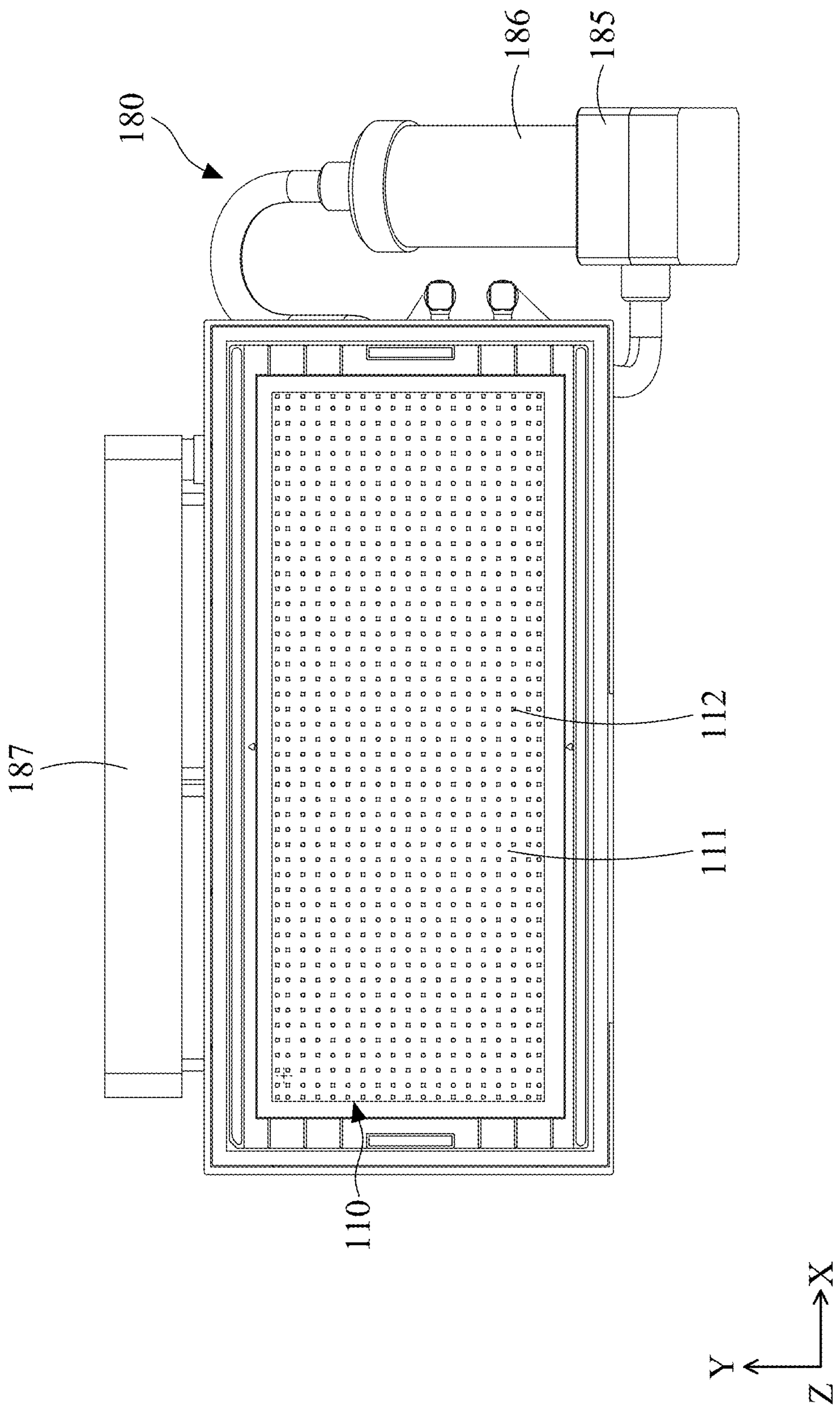
FIG. 7 shows a top view of the thermal-dissipation element in accordance with some embodiments of the present disclosure.
Figure 8:
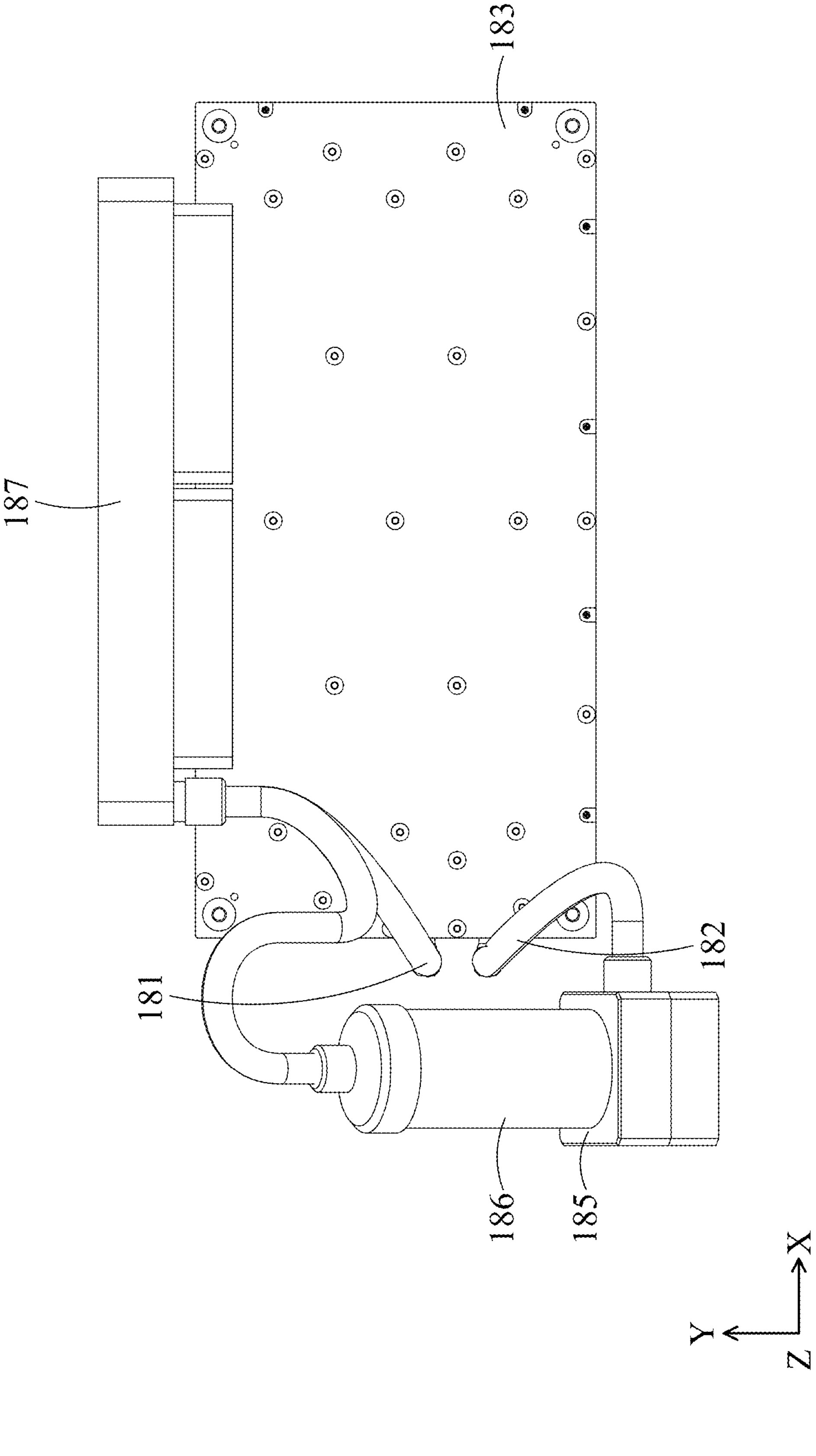
FIG. 8 shows a bottom view of the thermal-dissipation element in accordance with some embodiments of the present disclosure.
Figure 9:
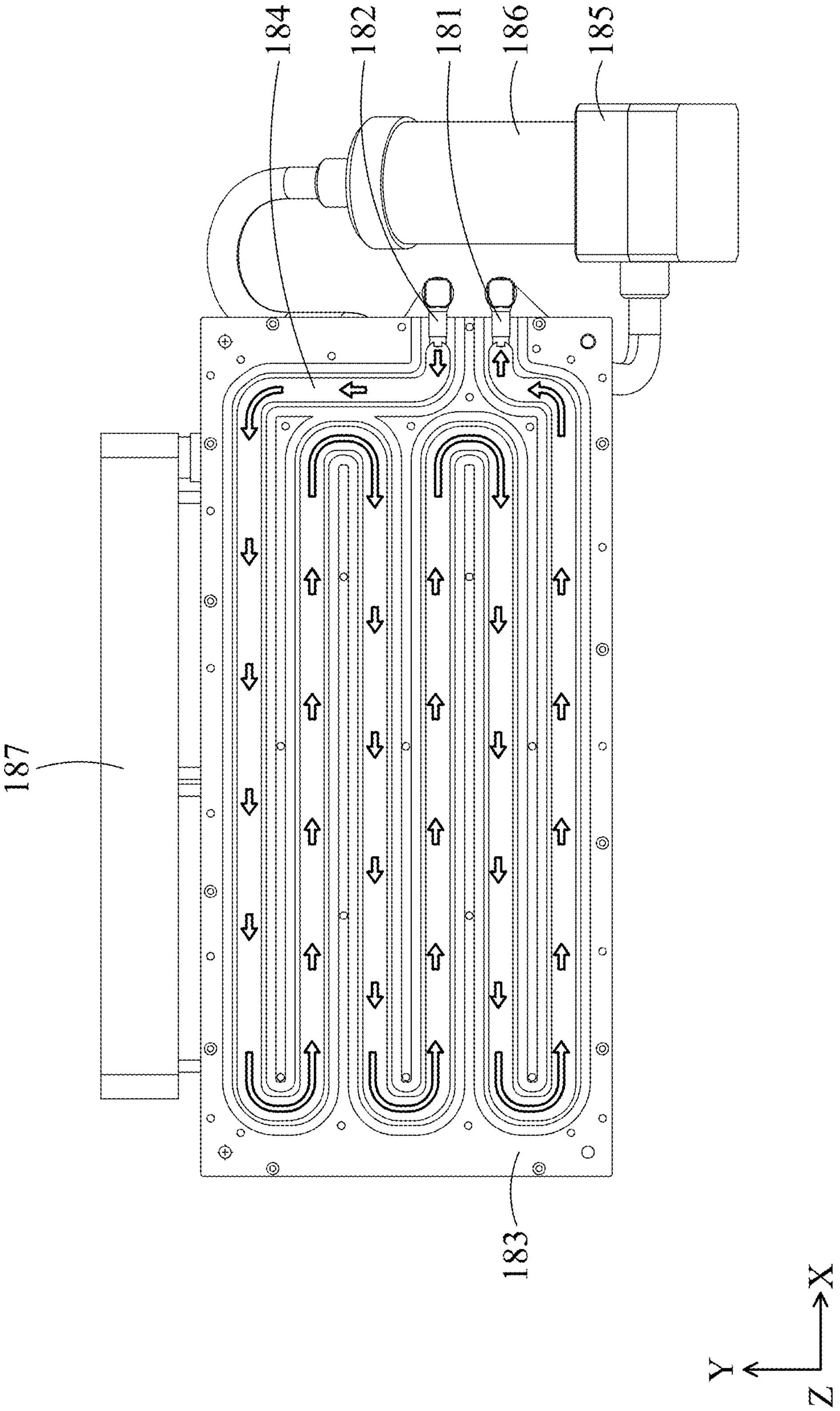
FIG. 9 shows a schematic view of the interior of the thermal-dissipation element in accordance with some embodiments of the present disclosure.

FIG. 7 shows a top view of the thermal-dissipation element 180 in accordance with some embodiments of the present disclosure. FIG. 8 shows a bottom view of the thermal-dissipation element 180 in accordance with some embodiments of the present disclosure. FIG. 9 shows a schematic view of the interior of the thermal-dissipation component 180 in accordance with some embodiments of the present disclosure. It should be noted that the thermal-dissipation element 180 may replace the thermal-dissipation element 160 and be disposed on the lower surface of the backlight 110 to dissipate the heat generated by the heat source (for example, the light-emitting elements 112) of the display device 100. As shown in FIGS. 7 through 9, the thermal-dissipation element 180 includes a cooling plate 183 and opposite fluid inlets/outlets 181 and 182. Specifically, the fluid can be driven by the pump 185 to flow from the fluid inlet/outlet 182 into the flow channel 184 of the cooling plate 183 (referring to FIG. 9). The flow channel 184 may be distributed throughout the cooling plate 183 (and the corresponding area of the backlight 110), thereby ensuring that fluid flows in all areas of the backlight 110, and reducing the risk of generating local hot spots that may cause local damage to the display device. After the fluid performs heat exchange in the flow channel 184 (that is, dissipates the heat generated by the display device), the fluid may leave the cooling plate 183 via the fluid inlet/outlet 181 and reach the heat sink 187. The fluid exchanges heat (for example, being cooled down) with the external environment in the heat sink 187 (for example, including a water-cooling heat sink and/or a fan), and the cooled fluid returns to the fluid tank 186 and is driven by the pump 185 to circulate in the thermal-dissipation element 180 to continuously dissipate the heat generated by the display device. In some embodiments, in a cross-sectional view (not shown), the backlight 110 is disposed on the heat sink 187. In some embodiments, the backlight 110 and the heat sink 187 are in contact with each other, thereby allowing the heat sink 187 to effectively dissipate heat generated by the backlight 110.

In some embodiments, the flow direction of the fluid can be adjusted according to the cooling requirements. In other words, the fluid can selectively flow into the flow channel 184 of the cooling plate 183 via the fluid inlet/outlet 181 and flow out of the cooling plate 183 via the fluid inlet/outlet 182 as required. In this way, the position where the fluid with a lower temperature flows through the cooling plate 183 (that is, the position with better thermal-dissipation effect) can be controlled, thereby reducing the risk of generating local hot spots in the backlight 110. However, the present disclosure is not limited thereto. In other embodiments, the fluid regularly flows out of the cooling plate 183 via the fluid inlet/outlet 181, and flows into the cooling plate 183 via the fluid inlet and outlet 182. It should be understood that, since the thermal-dissipation element 180 is not located in the display direction of the display device, the thermal-dissipation element 180 may be an opaque element, and the fluid flowing in the thermal-dissipation element 180 may also be an opaque fluid so as to improve the diversity of design of the display device.

Figure 10:
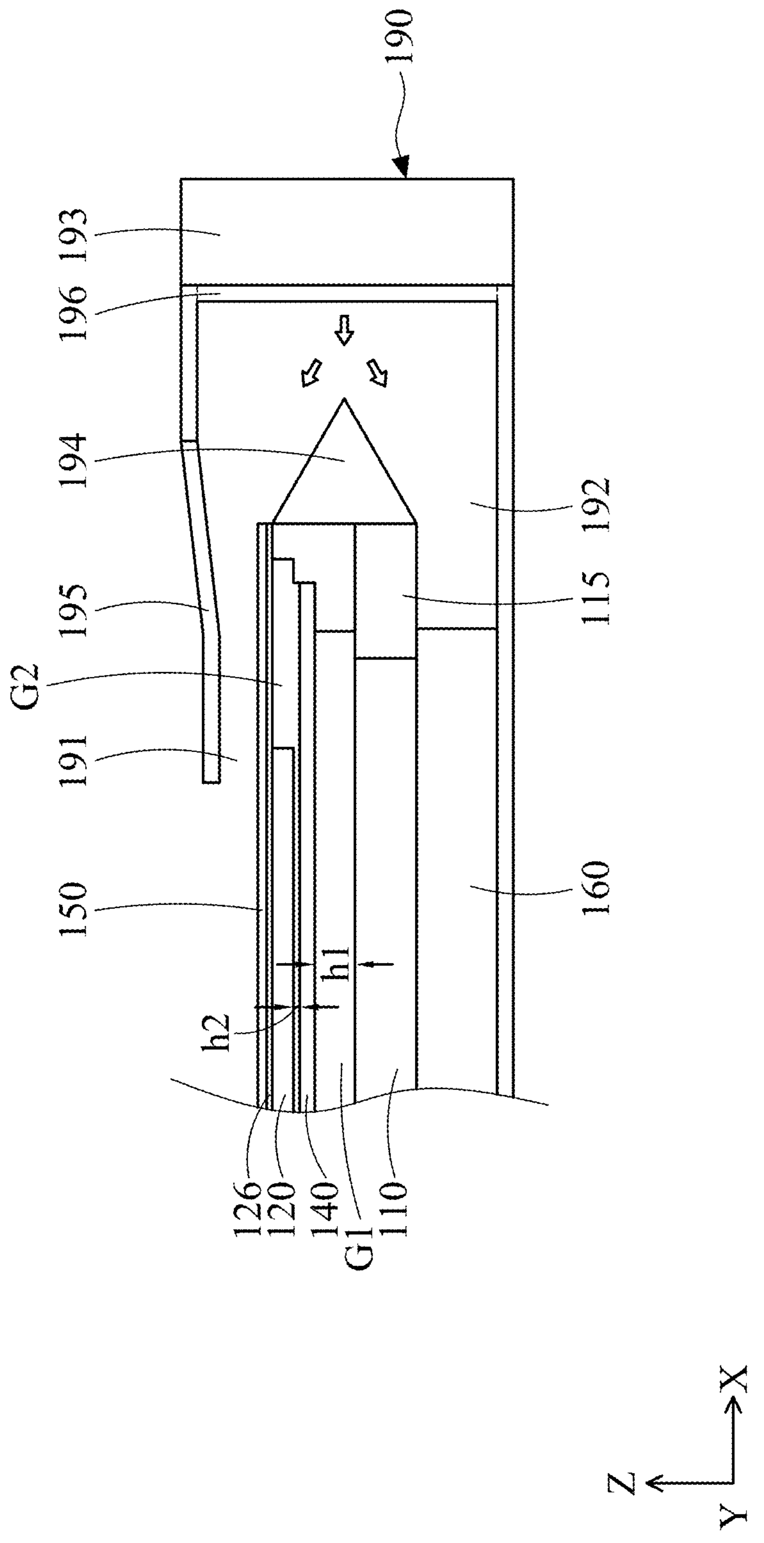
FIG. 10 shows a partial cross-sectional view of the display device in accordance with some embodiments of the present disclosure.

FIG. 10 shows a partial cross-sectional view of the display device 300 in accordance with some embodiments of the present disclosure. It should be understood that the display device 300 of this embodiment may include elements or portions that are the same as or similar to those of the display device 100 shown in the above embodiment. These elements or portions will be denoted by the same or similar reference numerals and will not be described in detail below for the sake of brevity. As shown in FIG. 10, the display device 300 may include a backlight 110, a panel 120, an optical layer 140, a cover plate 150, and a thermal-dissipation element 160. The display device 300 may include a thermal-dissipation element 190, which includes air channels 191, 192, a heat sink 193, a flow divider 194, and a guiding plate 195. In some embodiments, the heat sink 193 may be disposed around the backlight 110 and the panel 120, and may be, for example, a fan, driving the fluid to enter the display device 300 via the opening 196 of the thermal-dissipation element 190. In some embodiments, the heat sink 193 may overlap with the backlight 110 and the panel 120 in a horizontal direction (for example, a direction parallel to the X-Y plane). The heat sink 193 may face the flow divider 194 which is disposed beside the backlight 110 and the panel 120, so that the fluid flows through the air channels 191 and 192, respectively. As a result, the fluid will cover the upper surface of the panel 120 or flow toward the thermal-dissipation element 160 (as indicated by the arrow in the figure) to dissipate the heat generated by the heat source of the display device 300. In some embodiments, the center of the heat sink 193 may be aligned with the center of the flow divider 194, thereby allowing the fluid to flow toward the upper surface of the panel 120 and the lower surface of the backlight 110.

As shown in FIG. 10, the guiding plate 195 may be disposed above the cover plate 150 and connected to the heat sink 193. In some embodiments, the guiding plate 195 is separated from the cover plate 150 and forms an air channel 191. The guiding plate 195 may be configured to guide the fluid to flow through the upper surface of the panel 120 to effectively dissipate the heat generated by the heat source of the display device 300. In some embodiments, the guiding plate 195 may be non-linear and gradually approach the cover plate 150 toward the center of the display device 300. In other words, the height of the guiding plate 195 near the center of the display device 300 (that is, away from the heat sink 193) is lower than the height of the guiding plate 195 away from the center of the display device 300 (that is, close to the heat sink 193). In this way, the velocity of the fluid flowing through the air channel 191 can be accelerated, thereby improving the thermal-dissipation efficiency of the thermal-dissipation element 190.

In addition, in some embodiments, a first thermal-dissipation space G1 may be provided between the backlight 110 and the optical layer 140. That is, the backlight 110 and the optical layer 140 are separated by the first thermal-dissipation space G1. The first thermal-dissipation space G1 has a height h1, thereby reducing the risk of the optical layer 140 being damaged by high heat generated by the backlight 110. In addition, in some embodiments, a second thermal-dissipation space G2 is provided between the optical layer 140 and the panel 120. That is, the optical layer 140 and the panel 120 are separated by the second thermal-dissipation space G2. The second thermal-dissipation space G2 has a height h2, thereby reducing the risk of damage to components (such as liquid-crystal) in the panel 120 due to high heat generated by the backlight 110. For example, the height h1 may be the shortest distance between the backlight 110 and the optical layer 140, and the height h2 may be the shortest distance between the optical layer 140 and the panel 120. In some embodiments, the height h1 may be greater than the height h2. However, the present disclosure is not limited thereto.

Figure 11:
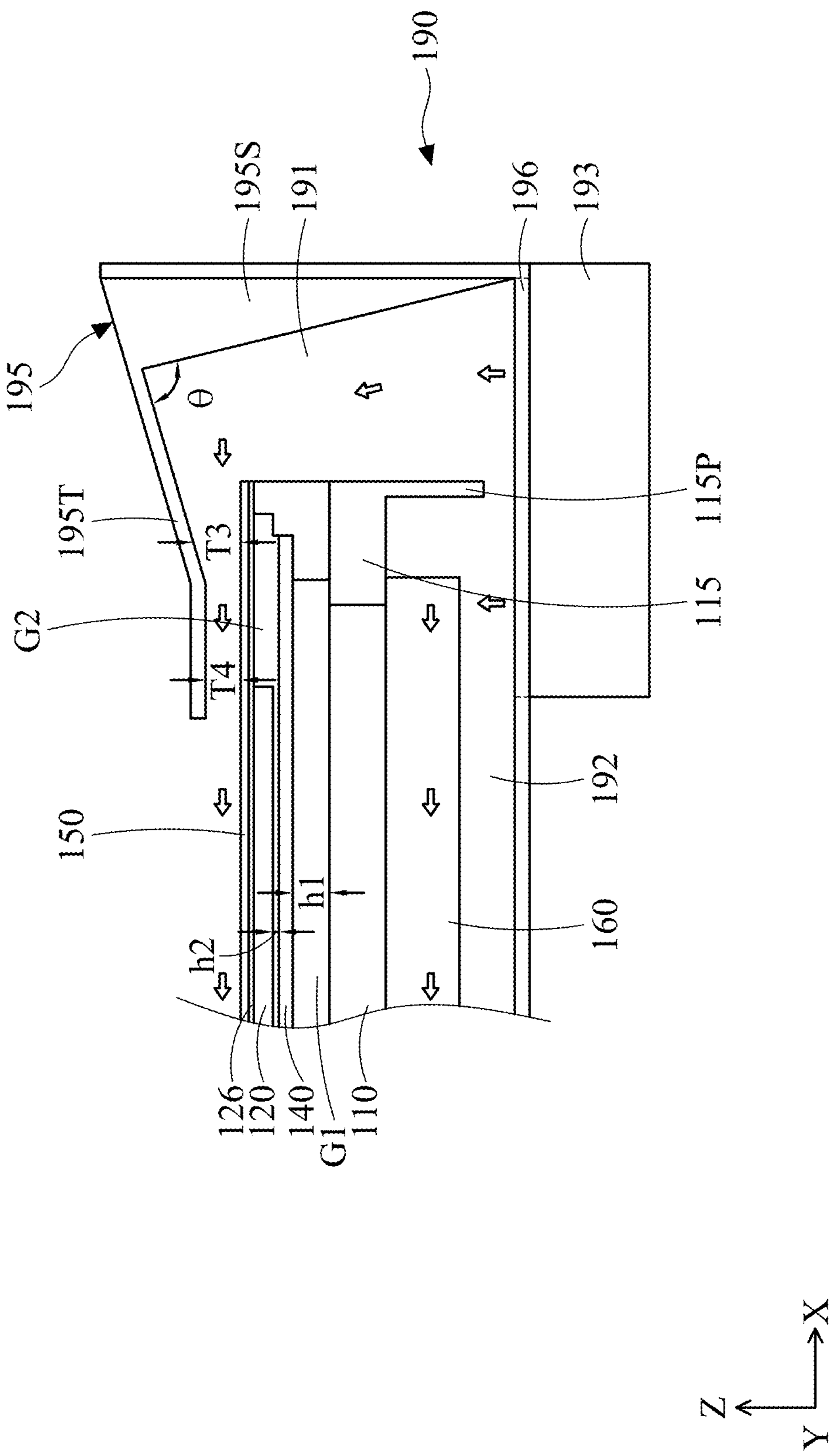
FIG. 11 shows a partial cross-sectional view of the display device in accordance with some embodiments of the present disclosure.

FIG. 11 shows a partial cross-sectional view of the display device 400 in accordance with some embodiments of the present disclosure. It should be understood that the display device 400 of this embodiment may include elements or portions that are the same as or similar to those of the display device 100 shown in the above embodiment. These elements or portions will be denoted by the same or similar reference numerals and will not be described in detail below for the sake of brevity. As shown in FIG. 11, the display device 400 may include a backlight 110, a panel 120, an optical layer 140, a cover plate 150, and a thermal-dissipation element 160. The display device 400 may include a thermal-dissipation element 190, which includes air channels 191 and 192, a heat sink 193, and a guiding plate 195. In some embodiments, the heat sink 193 may be disposed below the backlight 110 and may be, for example, a fan, which drives the fluid to enter the display device 400 via the opening 196 of the thermal-dissipation element 190. In some embodiments, the heat sink 193 may at least partially overlap the backlight 110 in a vertical direction (for example, a direction parallel to the X-Y plane). The heat sink 193 may have a protrusion 115P protruding downward toward the support structure 115, so that the fluid flows through the air channels 191, 192, respectively (as indicated by arrows in the figure). As a result, the fluid will cover the upper surface of the panel 120 or flow toward the thermal-dissipation element 160 (as indicated by the arrow in the figure) to dissipate the heat generated by the heat source of the display device 400. In some embodiments, the center of the heat sink 193 may be aligned with the center of the protrusion 115P, thereby allowing the fluid to flow toward the upper surface of the panel 120 and the lower surface of the backlight 110, respectively. However, the present disclosure is not limited thereto.

In this embodiment, the guiding plate 195 may include an upper surface 195T and a sidewall 195S that are connected to each other. The sidewall 195S may be connected to the heat sink 193, and the upper surface 195T may extend above the cover plate 150. In some embodiments, the guiding plate 195 is separated from the support structure 115 and the cover plate 150 and forms an air channel 191. The guiding plate 195 may be configured to guide the fluid to flow through the upper surface of the panel 120 to effectively dissipate the heat generated by the heat source of the display device 400. In some embodiments, the sidewall 195S of the guiding plate 195 may be inclined, and the upper surface 195T of the guiding plate 195 may be bent and gradually approach the cover plate 150 toward the center of the display device 400. In some embodiments, the angle θ between the surface 195T and the sidewall 195S may be between about 20 degrees and about 70 degrees, such as about 30 degrees, about 40 degrees, about 50 degrees, about 60 degrees, etc., but the present disclosure is not limited thereto. In some embodiments, the height of the guiding plate 195 near the center of the display device 400 will be lower than the height of the guiding plate 195 away from the center of the display device 400. That is, the thickness T4 of the air channel 191 near the center of the display device 400 is less than the thickness T3 of the air channel 191 away from the center of the display device 400. In this way, the velocity of the fluid flowing through the air channel 191 can be accelerated, thereby improving the thermal-dissipation efficiency of the thermal-dissipation element 190.

It should be understood that although the above embodiments merely illustrate a partial configuration of the display device, those skilled in the art should be able to dispose other optical layers and/or optical elements (such as a lower diffusion film, an upper diffusion film, a lower brightness enhancement film, an upper brightness enhancement film, a prism sheet, or an inverse prism sheet, etc.) in the structure described in the present disclosure according to the teachings of the present disclosure and for the purpose of enhancing the display and/or touch effects, but the present disclosure is not limited thereto. These configurations derived from the present disclosure are also included in the scope of the present disclosure. In addition, the present disclosure also provides several different display devices. Those skilled in the art should be able to arbitrarily combine/arrange these display devices without violating the teachings of the present disclosure, and these combinations and arrangements are all within the scope of the present disclosure. Similarly, the above embodiments also provide a variety of different thermal-dissipation elements. Those skilled in the art should be able to arbitrarily combine/arrange these thermal-dissipation elements in a single or multiple display devices without violating the teachings of the present disclosure, and these arrangements and combinations are all within the scope of the present disclosure. All possible embodiments will not be listed one-by-one below.

As set forth above, the embodiments of the present disclosure provide a display device including a transparent thermal-dissipation element. Specifically, the thermal-dissipation element is disposed between the backlight and the panel, and is a transparent element. In this way, the thermal-dissipation element can separate the panel, the optical layer and the heat source (such as the light-emitting elements), thereby reducing the risk of failure of the panel and the optical layer due to heat. In addition, a guiding plate and a flow divider may be provided to accelerate the fluid velocity, thereby improving the thermal-dissipation efficiency of the thermal-dissipation element.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A display device, comprising:

a backlight for providing a light source;

a panel disposed over the backlight for displaying an image;

a first thermal-dissipation element disposed between the backlight and the panel, wherein the first thermal-dissipation element is a transparent element so that the light source can be provided to the panel, wherein the first thermal-dissipation element has a cavity, fluid fills into the cavity, and when the display device is in operation, the fluid flows in the cavity; a second thermal-dissipation element disposed on a lower surface of the backlight and comprising a plurality of thermal-dissipation fins, wherein the fluid flows through the plurality of thermal-dissipation fins and a third thermal-dissipation element comprising a guiding plate disposed above and spaced apart from a cover plate by an air channel, wherein the guiding plate is non-linear and gradually approaches the cover plate toward the center of the display device, and the guiding plate is configured to direct the fluid through the air channel and onto an upper surface of the panel, such that the fluid is directed toward the center of the display device.

2. The display device as claimed in claim 1, wherein the fluid comprises gas or liquid.

3. The display device as claimed in claim 2, wherein the gas comprises atmospheric air.

4. The display device as claimed in claim 2, wherein the liquid comprises water, ethylene glycol, diethylene glycol, or propylene glycol.

5. The display device as claimed in claim 1, further comprising a flow divider allowing the fluid to flow towards the upper surface of the panel and a lower surface of the backlight, respectively.

6. The display device as claimed in claim 5, wherein the third thermal-dissipation element further comprises a heat sink, and a center of the heat sink is aligned with a center of the flow divider.

7. The display device as claimed in claim 6, wherein the guiding plate is connected to the heat sink.

8. The display device as claimed in claim 1, further comprising a ventilation module in communication with the cavity and configured to drive the fluid to flow in the cavity, wherein the ventilation module comprises a plurality of thermal-dissipation fins.

9. The display device as claimed in claim 1, wherein when the display device reaches a critical temperature, the fluid flows in the cavity.

10. The display device as claimed in claim 9, wherein when the display device is below the critical temperature, the fluid stops flowing in the cavity.

11. The display device as claimed in claim 1, further comprising an optical layer disposed between the panel and the first thermal-dissipation element, wherein a first thermal-dissipation space is provided between the backlight and the optical layer, a second thermal-dissipation space is provided between the optical layer and the panel, and a height of the first thermal-dissipation space is greater than a height of the second thermal-dissipation space.

12. The display device as claimed in claim 1, wherein the first thermal-dissipation element comprises an upper transparent layer and a lower transparent layer defined the cavity, and a thickness of the upper transparent layer is less than the thickness of the lower transparent layer.

13. The display device as claimed in claim 12, wherein the lower transparent layer extends onto a support covering an integrated circuit element.

14. The display device as claimed in claim 1, wherein the first thermal-dissipation element comprises a fluid inlet in communication with the cavity, and a thickness of the cavity is greater than a thickness of the fluid inlet.

15. The display device as claimed in claim 14, wherein the thickness of the fluid inlet is in the range of about 2 mm to about 8 mm.

16. The display device as claimed in claim 14, wherein the thickness of the cavity is in the range of about 3 mm to about 13 mm.

17. The display device as claimed in claim 1, wherein the backlight comprises a plurality of light-emitting elements and a plurality of barrier walls disposed around the light-emitting elements, and the barrier walls have arc-shaped sidewalls.

18. The display device as claimed in claim 17, wherein a number of the light-emitting elements disposed between two adjacent outermost barrier walls is greater than the number of the light-emitting elements disposed between two adjacent inner barrier walls.

* * * * *